Nov. 20, 1956
T. A. DOBBIE ET AL
2,771,228
CONSTANT RATE LIQUID DISPENSER
Filed Feb. 12, 1954
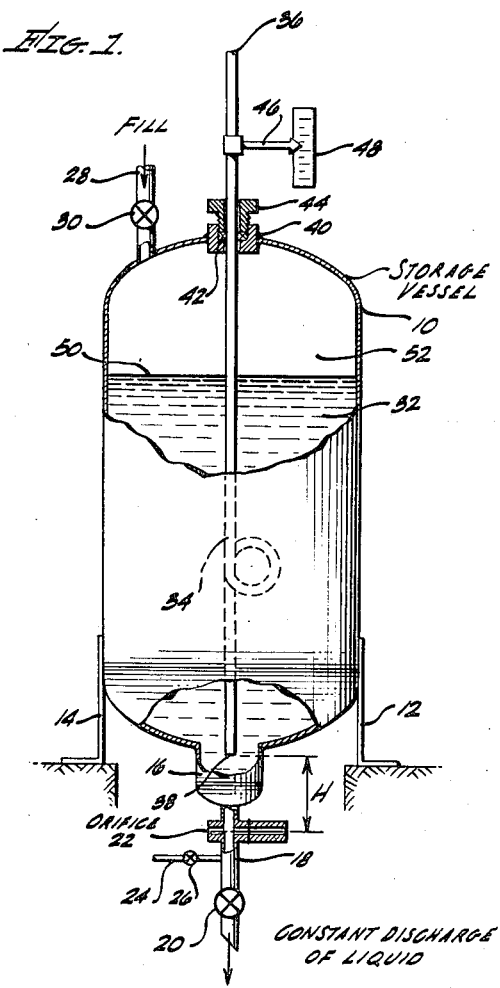
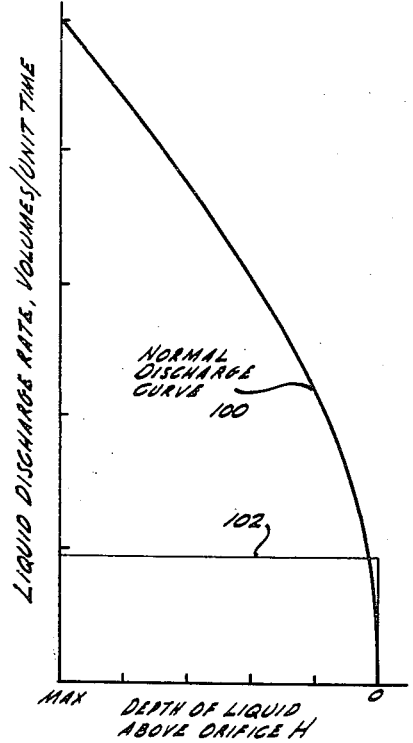
INVENTORS.
THOMAS A. DOBBIE,
JOHN B. STURGESS,

United States Patent Office 2,771,228
Patented Nov. 20, 1956

2,771,228

CONSTANT RATE LIQUID DISPENSER

Thomas A. Dobbie, La Canada, and John B. Sturgess, San Gabriel, Calif., assignors to Union Oil Company of California, Los Angeles, Calif., a corporation of California Application February 12, 1954, Serial No. 409,860

8 Claims. (Cl. 222—481.5)

This invention relates to the handling of liquids and particularly is directed to the dispensing of liquids at constant rates from storage reservoirs or tanks and the like in spite of a dropping liquid level therein. More specifically, this invention relates to an apparatus which dispenses up to 99.95% or more of its liquid contents at a constant volumetric rate and which apparatus is mechanically simple and involves no moving parts, floats, and the like.

The flow of liquids through orifices is such that the liquid velocity in the orifice is proportional to the square root of the hydrostatic head of liquid acting above the orifice and accordingly the volumetric rate of liquid discharge is proportional to the product of the cross-sectional area of the orifice and the square root of this hydrostatic head. This relationship is given by the following equation:

$$q = kS_o(2gH)^{1/2} \qquad (1)$$

wherein $q$ is the volumetric rate of liquid discharge in cubic feet per second, $k$ is a dimensionless proportionally factor equal to about 0.61 for sharp-edged orifices, $S_o$ is the cross-sectional area of the orifice in square feet, $g$ is the acceleration of gravity and is equal to 32.2 feet per second per second, and $H$ is the hydrostatic head of liquid in feet measured upwardly from the orifice.

Thus it is seen from Equation 1 that in the discharge of the liquid contents of a storage tank through an orifice at its outlet, the liquid flow rate will decrease with time because with the discharge the liquid level drops causing the value of factor H in Equation 1 to decrease.

This decrease in discharge rate is undesirable in many instances where, for various reasons, constant liquid discharge rates are required such as in oil blending and chemical mixing operations, liquid dispensing in general, such as for example the addition of liquid fertilizers, fertilizer solutions, aqueous ammonia or aqueous solutions of the soluble forms of phosphorus, sulfur, potassium, and other elements to irrigation water required by growing crops.

Numerous attempts have been made to provide such constant liquid flows and ordinarily require proportioning pumps, complex mechanical systems using floats, orifices of variable areas, and the like. Even so, in addition to the mechanical complexities of such systems, problems are encountered involving a falling rate period of liquid discharge after between about 50% and 80% of the liquid has been discharged. The present invention therefore is drawn to a simple mechanical device which employs no moving parts and which discharges the particular liquid at a constant rate up until substantially the total contents have been delivered. For example, up to 99.95% or more of the liquid contents of a storage or feed tank can be discharged at rates which are constant to within a few percent.

It is therefore a primary object of this invention to provide a simple mechanical device for the dispensing of liquids at substantially constant rates.

It is a more specific object of this invention to provide, in combination with a liquid storage tank, an improved simple mechanical apparatus whereby substantially the total quantity of liquids contained in the vessel may be discharged at such constant flow rates whereby the problems of a terminal falling rate period are eliminated.

Other objects and advantages of this invention will become apparent to those skilled in the art as the description thereof proceeds.

Briefly, the present invention comprises a closed liquid storage vessel having a relatively large diameter and which is provided with a dependent auxiliary reservoir of relatively low diameter and which communicates at its upper end with the bottom of the storage vessel. An outlet opening for the constant volumetric liquid discharge in turn opens from the bottom of the auxiliary reservoir. This outlet is provided with a flow control orifice, such as an adjustable valve which would have a variable open area, or if desired the discharge outlet may be provided with a shutoff valve or cock and a separate flow orifice of fixed area. While this orifice may be of any of the well-known types, it is preferred to employ an orifice plate having a plurality of various sized orifices and which is maintained between flanges in the discharge outlet so that rotation of the orifice plate brings the orifices of various sizes successively into alignment with the discharge pipe. This permits the cross-sectional area of $S_o$ of the orifice to be charged in a simple manner so that a variation in the permissible liquid discharge rate may be effected.

The vessel is preferably provided with a separate inlet pipe and a valve which is closed during operation of the apparatus. The vessel in addition is provided with a vent tube, open at its upper and lower ends, and extending from its inlet end at a point outside and above the top of the vessel down into the vessel and terminates with its lower open end at a point adjacent the bottom thereof and preferably within the auxiliary reservoir. This vent pipe is preferably made adjustable through the provision of a sealing gland or other seal at the point where it passes through the storage vessel wall. This permits the positioning of the lower open end of the vent pipe at various levels within the auxiliary reservoir whereby the distance between the lower end of the vent pipe and the outlet orifice described above may be varied.

The structure of a preferred form of the apparatus of this invention and its performance during operation are more clearly described in the accompanying drawings in which:

Figure 1 is an elevation view in partial cross section of the device of this invention, and, Figure 2 is a graph showing the relationship between the volumetric discharge rate and the head of liquid standing above the orifice for the usual storage tank and for the improved device of the present invention.

Referring now more particularly to Figure 1, a closed storage vessel 10, having supports 12 and 14 and a relatively large diameter, is provided at its lower end with a communicating auxiliary reservoir 16 of relatively small diameter. Opening from the lower point of reservoir 16 is discharge outlet line 18 provided with shutoff valve 20 and rotatable orifice plate 22, as described above. Vent line 24 provided with valve 26 opens into discharge line 18 at the downstream side of orifice 22 so as to prevent any siphon effect in line 18 from disturbing the hydrostatic head of liquid acting on the upstream side of the orifice.

Storage vessel 10 is further provided with inlet opening 28 having shutoff valve 30 and by means of which a body of liquid 32, to be discharged at a substantially constant rate, is introduced into the vessel. Vessel 10 is further provided with an elongated atmospheric vent pipe 34 open at its upper and lower ends 36 and 38 respectively. Upper end 36 is positioned above and outside storage vessel 10 and lower end 38 is positioned within vessel 10 at a point adjacent the bottom thereof and preferably, in order to secure a substantially complete discharge of the liquid contents at a constant rate, is positioned within auxiliary vessel 16 and below the point at which reservoir 16 communicates with the bottom of vessel 10. Since a partial vacuum is created within the upper portion of vessel 10 during the discharge of the liquid contents thereof, a sealing gland 40 provided with packing 42 and packing nut 44 is provided at the point where vent tube 34 passes through the wall of vessel 10.

If desired, indicator 46 may be attached to vent tube 34 and further provided with a graduated scale 48. The scale may be calibrated in terms of distance between orifice plate 22 and the lower open end 38 of vent tube 34 so that the effective hydrostatic head acting at orifice 22 may be read directly on the scale. This scale may be further calibrated in terms of liquid discharge rates for various sized orifices.

In operation of this device valve 30, shutoff valve 30 is opened and the liquid to be dispensed is introduced into vessel 10 through line 28. Valve 30 is then closed. With the orifice of the desired cross-sectional area in position at 22 and the lower open end 38 of vent tube 34 adjusted at the desired height above the orifice, valve 20 is opened whereby liquid is discharged and liquid level 50 begins to drop. Because the upper portion of the vessel is gas tight, a partial vacuum is created in space 52 and which increases with decreasing levels to the point where the vacuum is sufficient to suspend the body of liquid 32 which exists between level 50 and the lower open end of vent pipe 34. During this time the liquid level within vent pipe 34 drops from a level opposite level 50 to a point coincident with lower opening 38. The device is then ready to discharge liquids at a constant rate. The amount of liquid withdrawn during this start-up period is reduced to the liquid volume of vent pipe 34 by completely filling vessel 10 with liquid when beginning the operation. This is the preferred way to use this device. In such an instance negligible quantities of liquid are withdrawn in placing the device in operation.

Upon the opening of discharge valve 20, the liquid contents of vessel 10 will flow through orifice 22 at a volumetric rate which is proportional to the cross-sectional area of the orifice then in position and the hydrostatic head existing between orifice 22 and the lower opening 38 of vent tube 34. The partial vacuum described above suspends only that amount of liquid above outlet 38 so that the theoretical hydrostatic head of this depth of liquid is neutralized by the partial vacuum and reduces the effective pressure at point 38 to atmospheric pressure. The further discharge of liquid from the system, after the initial start-up discharge, causes level 50 to drop further which tends to increase the partial vacuum, e. g. lower the pressure in the top of the vessel. When this occurs, atmospheric air or other gas passes downwardly through vent tube 34 and bubbles up from lower opening 38 through the liquid body into the upper gas space to compensate for the liquid so removed. The partial vacuum is the greatest when the vessel is the fullest and during operation the partial vacuum decreases and the subatmospheric pressure in the top gas space of storage vessel 10 rises and approaches atmospheric pressure at the time when liquid level 50 has dropped to a point coinciding with lower outlet opening 38 of vent tube 34. During this entire period, the rate of liquid discharge is absolutely constant because the cross-sectional area $S_0$ of the orifice 22 and the effective hydrostatic head of liquid between orifice and lower opening 38 remain absolutely constant.

In order to prevent any continuous or intermittent siphoning effect of liquid passing through discharge line 18 from supplementing the effective hydrostatic head referred to above, an auxiliary vent line 24 is provided opening into discharge line 18 permitting the entrance of atmospheric air whereby the downstream side of orifice 22 is continuously maintained at atmospheric pressure to insure the constancy of the hydrostatic head H. Any siphoning effect due to the formation of a liquid column in discharge line 18 would effectively increase the hydrostatic head and would accordingly increase the discharge rate over that normally obtained.

In order that a substantially complete discharge of the liquid contents may be maintained at constant rate, the liquid volume above lower end 38 of vent tube 34 must represent substantially the entire liquid contents of the vessel. Accordingly, storage vessel 10 is constructed as high as permissible considering the vapor pressure and hydrostatic head limitations discussed below and the diameter is made as great as is necessary to contain the desired quantity of liquid. The diameter of auxiliary reservoir 16 is made greater than about 2 times the diameter of vent pipe 38 and as high as is required to give the necessary hydrostatic head H to provide the desired maximum liquid discharge rate with the orifice of the largest permissible size. Hereby the volume of liquid contained in auxiliary reservoir 16 is reduced to the absolute minimum which, in some large installations, may be as small as 0.0001%, or smaller.

Referring now more particularly to Figure 2, two curves appear showing the variation in the volumetric rate of liquid discharge with depth of liquid above the discharge orifice. Curve 100 represents the normal discharge curve of a tank provided with an orifice and clearly indicates the rapid decrease in the volumetric rate as the hydrostatic head H or depth of liquid above the orifice decreases as liquid is withdrawn. Equation 1 given above when plotted has a shape similar to curve 100.

Curve 102 indicates the relationship between the discharge rate and the actual height of the liquid level above the orifice. As shown, this curve consists of a relatively long horizontal portion indicating a substantial constancy of liquid discharge up to the time that substantially all the liquid has discharged and the liquid depth has fallen to a point adjacent the lower open end of the vent tube. This horizontal portion of the curve runs into a substantially vertical portion at which an extremely rapid decrease in the fluid rate to 0 takes place. The substantially vertical portion may, as described above, represent the discharge of less than 0.05% of the contents of the storage vessel so that more than 99.95% of the liquid contents is discharged at the constant rate shown by the horizontal portion of curve 102.

If desired, the device of the present invention may be combined with a low level alarm of any of the well-known types to either indicate the presence of a low liquid level in the storage vessel which is approaching the lower open end of vent tube 34, or such a low level alarm may be combined with automatic control equipment which serves to shut valves 20 and 26 and may also be connected to terminate the operation into which the constant discharge of liquid is effected, such as the flow of irrigation water.

Although there is no limitation upon the diameter of storage vessel 10, there is a limitation of the vessel height which is determined by the density and the vapor pressure of the liquid being dispensed.

When the liquid being dispensed has substantially no vapor pressure such as for example heavy oils, non-volatile acids such as phosphoric and sulfuric acids, and the like, the maximum height of the tank measured from the top down to the lowest position of the lower opening of the vent tube is equal to the length of a hydrostatic column of that liquid which can be supported by a perfect vacuum at its top, ordinarily 1 atmosphere or about 14.7 p. s. i. a. (pounds per square inch absolute). This height $h$ may be calculated from the following equation.

$$h = 144 \frac{P}{\rho} \qquad (2)$$

wherein P is the pressure of the column (14.7 p. s. i. a. with non-volatile liquids) and $\rho$ is the density of the liquid in pounds per cubic feet at the existing temperature conditions.

In certain instances, volatile fluids are to be dispensed in which case the permissible height of the vessel as described above is further reduced by an amount equal to the hydrostatic head which is equivalent to the vapor pressure of the liquid under the existing temperature conditions. For example, in the dispensing of commercial fertilizer grade aqueous ammonia containing 24.3 percent by weight $NH_3$, the maximum height of the vessel is reduced because this material at 80° F. has a vapor pressure of about 9.0 p. s. i. a. and thus the maximum hydrostatic head which can be supported by the partial vacuum in the top of the storage vessel is equal to 14.7 minus 9.0 or 5.7 p. s. i. a. This then is the maximum pressure characteristic of this system and the equivalent hydrostatic head is calculated according to Equation 2 above substituting this value of 5.7 for factor P. The specific gravity of this type of aqua ammonia is 0.9 and thus the liquid has a density of 56.2 pounds per cubic foot. From Equation 2, the maximum height is calculated to be 14.6 feet. To be on the safe side and to preclude problems arising from increases in temperature or systems of somewhat higher concentrations of ammonia, the actual height of the tank measured between the points indicated above should be somewhat less than 14.6 feet and a value of about 10 feet is appropriate.

In the calculation above, factor P in Equation 2 is therefore 14.7 for liquids which are substantially non-volatile and with volatile fluids factor P is 14.7 minus the vapor pressure of the solution at the existing temperature conditions. This equation therefore determines the maximum height in the present apparatus.

For dispensing volatile liquids then, Equation 2 and the vapor pressure correction applied as described above is given by the following:

$$h = 144 \frac{14.7 - VP}{\rho} \qquad (3)$$

wherein VP is the liquid vapor pressure in pounds per square inch at the existing temperature.

Of course in an operation in which the liquid is discharged into a system having a pressure different from atmospheric and the vent tube is also open to such a pressure, the value of 14.7 in Equations 2 and 3 must be corrected. Thus, the general equation for all liquids and all operations is:

$$h_{max} = 144 \frac{P_o - VP}{\rho} \qquad (4)$$

wherein $P_o$ is the ambient pressure in pounds per square inch absolute.

As an example of the present invention, the following data are given which are pertinent to the design and construction of the apparatus according to this invention for the dispensing of commercial aqueous ammonia into irrigation water and wherein the ammonia has a specific gravity of 0.9 and a vapor pressure of 9.0 p. s. i. at 80° F. The storage vessel has an inside diameter of 7.5 feet and is 10.0 feet high measured from the top of the vessel to the lower open end of the vent tube. The auxiliary reservoir is 0.5 foot in diameter and 1.0 foot high. The total volume of the system is 3300 gallons including a volume of 1.5 gallons contained in the auxiliary reservoir and it is this amount only which is discharged at a falling rate. Thus 99.955% of the 3300 gallons is discharged at a constant volumetric rate.

The discharge orifice is located 0.5 feet below the bottom of the auxiliary orifice, the orifice is 1.0 inches in diameter and the discharge pipe is a nominal 2-inch iron pipe size line. The effective liquid height acting on the orifice is thus 1.5 feet when the vent tube is raised to such a position that the lower opening coincides with the level at which the auxiliary reservoir and the storage vessel are joined. The value of $S_o$ in Equation 1 is 0.00545 square feet, the value of $k$ for a sharp-edged orifice is 0.61, and the value of H is 1.5 feet. The volumetric discharge rate is 14.6 gallons per minute which is sufficient to treat a flow of irrigation water of 146,000 gallons per minute.

In this example with an orifice which is variable between limits of 0.125 inch and 1.75 inches in diameter and wherein the effective hydrostatic head is variable between 0.50 and 1.5 feet, the minimum obtainable constant delivery rate is 0.038 gallon per minute and the maximum flow rate is 45 gallons per minute for the apparatus described in the foregoing example.

Obviously it is within the scope of this invention to change the dimensions appropriately to secure greater or lesser flow rates than those given above, but in each case in accordance with the principles of this invention a substantially complete delivery of the contents of the liquid at any desirable flow rate may be obtained by employing in combination with the storage vessel, the lower auxiliary reservoir of relatively low diameter and within the confines of which is positioned the lower open end of the vent tube as described.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

We claim:

1. An apparatus for dispensing a liquid at a constant rate which comprises a storage vessel, an inlet means opening thereinto for liquid, a lower outlet means opening therefrom, a flow control orifice disposed in said outlet means, and a vent pipe open at both ends and sealed at and extending through the wall of said vessel from a point outside and above the top thereof to a point inside and adjacent the bottom thereof.

2. An apparatus for dispensing a liquid at a constant rate from a storage vessel without moving parts and in spite of the dropping liquid level therein incident to liquid delivery which comprises a closed storage vessel, a sealable inlet means for liquids opening into said vessel, an outlet means opening from the bottom of said vessel, an orifice disposed in said outlet means, a vent pipe open at both ends extending from a point outside and above said vessel to a point inside and adjacent the bottom of said vessel, the liquid discharge rate being fixed at a constant value by the hydrostatic head existing between said orifice and the lower open end of said vent pipe, and by the open area of said orifice, and independent of the depth of liquid above the lower open end of said vent pipe.

3. An apparatus for constant rate liquid dispensing and capable of discharging substantially its entire liquid contents at a constant rate in spite of a dropping liquid level therein which comprises a liquid storage vessel of relatively large diameter, an auxiliary reservoir of relatively small diameter communicating directly in liquid-receiving relation with the lower end of said vessel, a sealable liquid inlet conduit into said vessel, an outlet conduit opening from the bottom of said auxiliary reservoir, a flow control orifice disposed therein, and an open ended vent pipe extending from outside and above said vessel through a seal at the vessel wall to a point above said outlet conduit and within said auxiliary reservoir, the liquid volume above the lower end of said vent pipe comprising substantially the total quantity of liquid contents and being equal to the volume of liquid which discharges at a constant rate.

4. An apparatus according to claim 3 wherein said vent pipe is provided with a packing gland type seal at the point where it passes through the wall of said vessel, said pipe being adjustable to vary the distance between the lower open end thereof and said orifice to vary the hydrostatic head acting on said orifice.

5. An apparatus according to claim 3 in combination with a second vent pipe opening from the atmosphere into said outlet conduit at a point downstream from said flow control orifice.

6. An apparatus according to claim 3 wherein said orifice comprises an orifice plate having a plurality of orifices of different areas, said plate being rotatable to place any single orifice of the desired area selected from said plurality of orifices into alignment with said outlet conduit.

7. An apparatus for the constant rate dispensing of a liquid and adapted to discharge substantially its entire liquid contents at such rate in spite of the dropping liquid level therein incident to liquid removal which comprises a closed liquid storage vessel of relatively large diameter and having a height not exceeding $h$ given by:

$$h = 144 \frac{P_o - VP}{\rho}$$

(wherein $h$ is the maximum height in feet, $P_o$ is the ambient pressure in pounds per square inch absolute, usually 14.7 p. s. i., $VP$ is the vapor pressure in pounds per square inch of the liquid dispensed at the existing temperature, and $\rho$ is the density of the liquid in pounds per cubic foot at the existing temperature, other consistent units may be substituted with an appropriate alteration of the factor 144), an auxiliary reservoir of relatively small diameter communicating directly in liquid-receiving relation with the bottom of said storage vessel, an inlet conduit opening into said vessel, a valve disposed in said inlet conduit, an outlet conduit opening from the bottom of said auxiliary reservoir, an orifice disposed within said outlet conduit, a vent line opening into said outlet conduit at a point downstream from said orifice, an open ended vent pipe extending through the wall of said vessel from a point outside and above said vessel to a point inside said auxiliary reservoir and above said orifice, said apparatus being adapted to discharge at a constant rate a total volume of said liquid equal to the volume contained therein above the lower end of said vent pipe.

8. An apparatus according to claim 7 wherein said vent pipe extends through the top of said storage vessel, in combination with means for sealing the vent pipe with the vessel and adapted to permit the positioning of the lower end of said vent pipe at various levels within said auxiliary reservoir.

References Cited in the file of this patent

UNITED STATES PATENTS

| | | |
|---|---|---|
| 28,581 | James | June 5, 1860 |
| 1,640,528 | Bruhn | Aug. 30, 1927 |
| 1,893,391 | Berry | Jan. 3, 1933 |
| 1,938,892 | Buttner | Dec. 12, 1933 |
| 2,333,310 | Greening | Nov. 2, 1943 |